Oct. 18, 1955 V. P. ALLOWAY Re. 24,073

STRAW CUTTER

Original Filed July 5, 1949 2 Sheets-Sheet 1

INVENTOR.
V. P. Alloway
BY
Kimmel & Crowell ATTORNEYS

Oct. 18, 1955 V. P. ALLOWAY Re. 24,073

STRAW CUTTER

Original Filed July 5, 1949 2 Sheets-Sheet 2

INVENTOR.
V. P. Alloway
BY
Kimmel & Crowell ATTORNEYS

United States Patent Office

Re. 24,073
Reissued Oct. 18, 1955

24,073

STRAW CUTTER

Vivian Perry Alloway, Spokane, Wash.

Original No. 2,611,407, dated September 23, 1952, Serial No. 102,987, July 5, 1949. Application for reissue February 24, 1953, Serial No. 338,632

2 Claims. (Cl. 146—119)

Matter enclosed in heavy brackets [ ] appears in the original patent but forms no part of this reissue specification; matter printed in italics indicates the additions made by reissue.

This invention relates to a straw cutting and spreading means with a combine or harvester.

In certain harvesters or combines the straw is discharged downwardly onto the ground at the rear of the harvester. In order to provide a means whereby the straw being discharged may be cut into small lengths which can be turned under the ground more readily than long lengths, I have provided a rotatable cutting means disposed at the straw outlet of the machine for cutting the straw into short lengths.

Another object of this invention is to provide a straw cutting means for a harvester which will also produce a force for throwing the straw at the rear of the harvester in a manner to more evenly distribute the straw over the ground.

A further object of this invention is to provide in combination with a harvester, a straw cutting means, together with a distributing means for spreading the straw as the latter is being discharged.

A further object of this invention is to provide in a harvester, a pair of rotatable straw cutters positioned at the discharge end of the harvester for cutting the straw into short lengths.

A further object of this invention is to provide in a harvester, a pair of oppositely rotatable cutters at the straw discharge end of the harvester, with one cutter rotating at a substantially greater speed than the other cutter so that the centrifugal force developed by the faster rotating cutter will force the cut straw to move rearwardly of the machine.

With the above and other objects in view, my invention consists in the arrangement, combination and details of construction disclosed in the drawings and specification, and then more particularly pointed out in the appended claims.

In the drawings:

Figure 4 is a fragmentary sectional view taken on the line 4—4 of Figure 2;

Figure 5 is a fragmentary sectional view taken on the line 5—5 of Figure 1.

Figure 1:
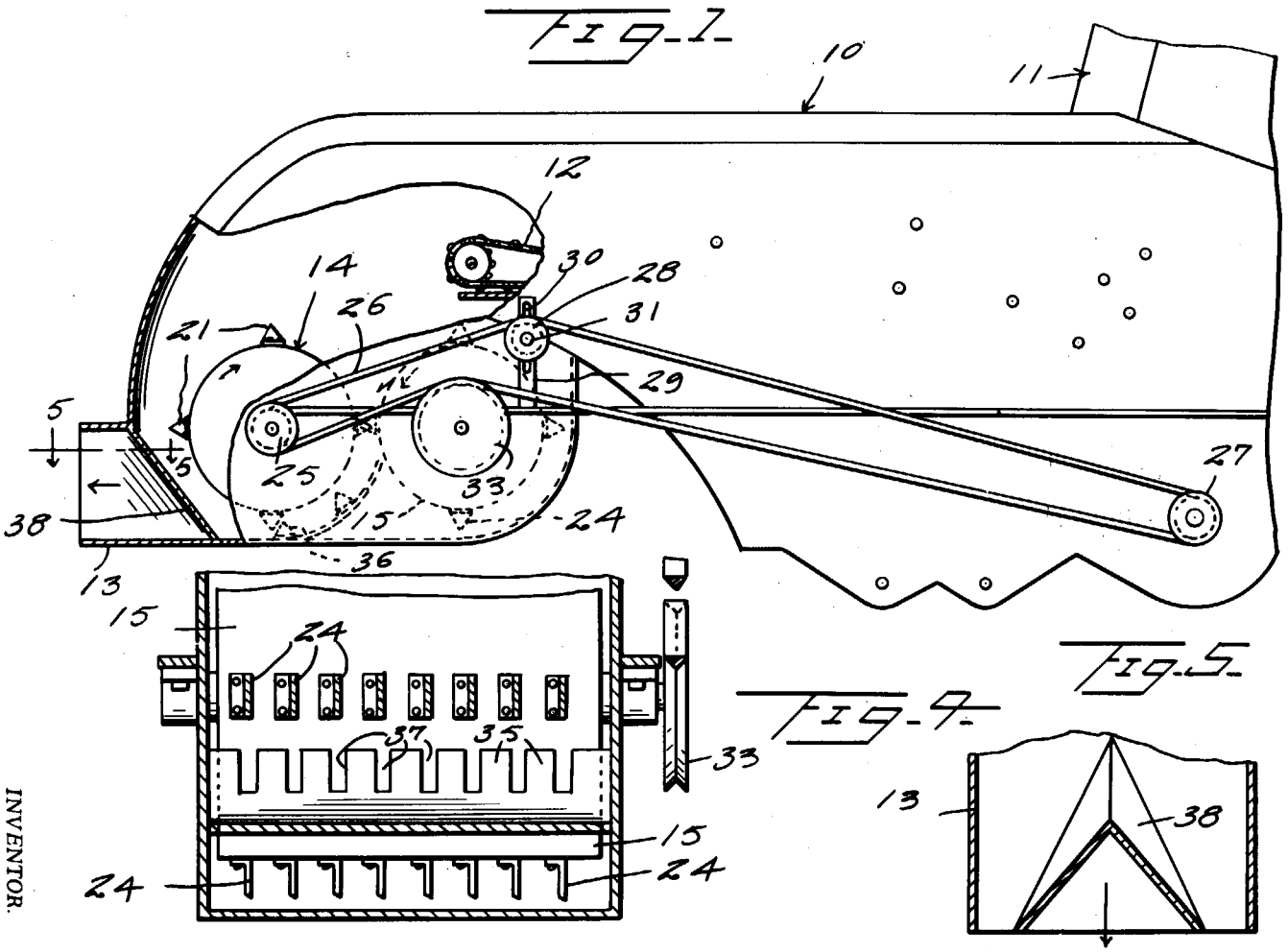
Figure 1 is a fragmentary side elevation, partly broken away and in section, of the rear portion of a harvester or combine having mounted in the straw discharge chute thereof a straw cutting means constructed according to an embodiment of this invention.
Figure 2:
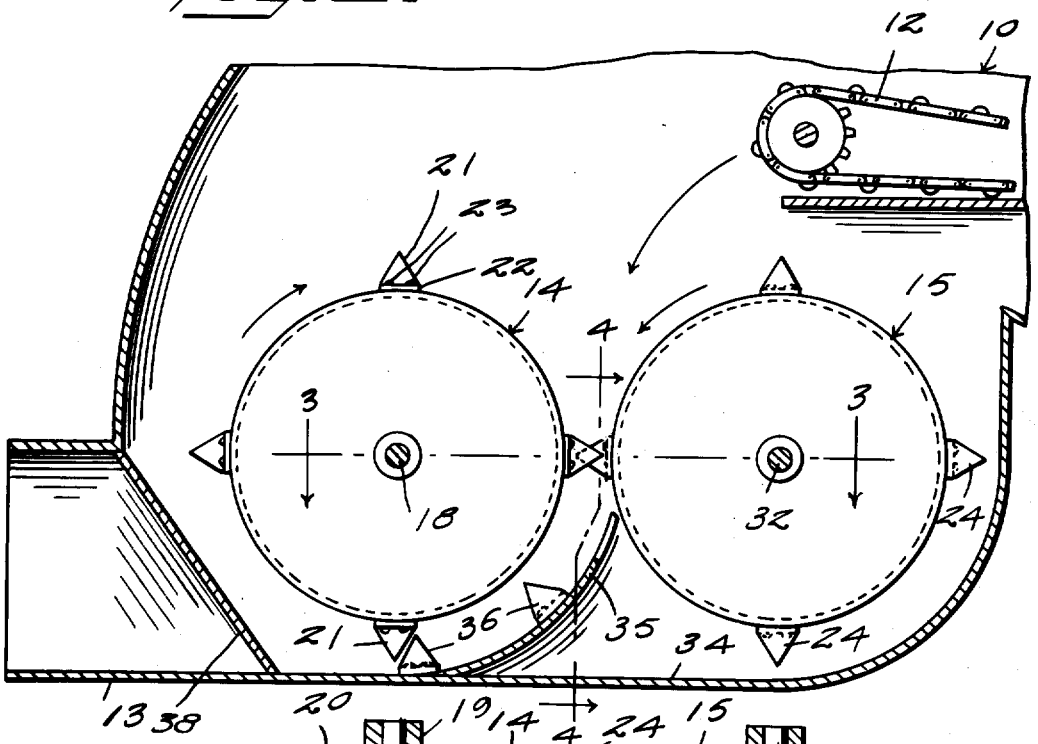
Figure 2 is a fragmentary vertical section of the cutting means in the discharge chute.
Figure 3:
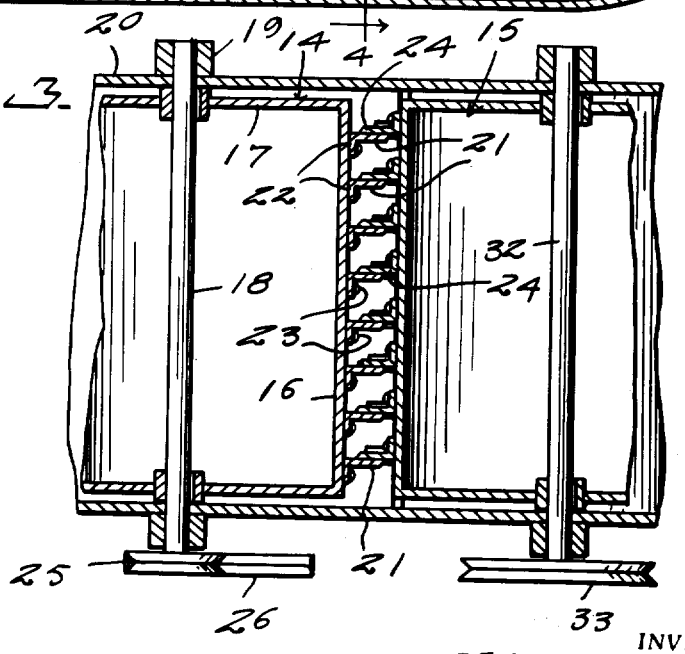
Figure 3 is a fragmentary sectional view taken on the line 3—3 of Figure 2.

Referring to the drawings, the numeral 10 designates generally the straw conducting chute at the rear of a harvester or combine generally designated as 11. The harvester or combine 11 with the straw conducting chute 10 is of conventional construction. The straw moving rearwardly within the chute 10 is moved by means of an endless conveyor 12 which discharges the straw at the rear of the chute 10, and the latter is provided with a horizontally and rearwardly directed discharge mouth 13 for discharging the straw rearwardly of the combine or harvester.

In order to provide a means whereby the straw moving rearwardly in the rear portion of the chute 10 will be comminuted or cut into relatively short lengths so that the straw may more readily be turned under for fertilizing and distribution purposes, I have provided a pair of rotary cutters generally designated as 14 and 15. The cutters 14 and 15 are of like construction and each includes a cylindrical body 16 having heads or end members 17 through which a shaft 18 extends. The shaft 18 is fixed relative to the cutter 14 and is journalled in bearings 19 carried by the sides 20 of the chute 10. The cylindrical wall 16 of the cutter 14 has secured thereto a plurality of spaced apart cutting blades 21 which are substantially triangular in said elevation and include a base flange 22 secured by fastening means 23 to the cylindrical wall 16. The cutter 15 is similar to the cutter 14, having cutting blades 24 on the peripheral surface thereof adapted to coact with the blades 21 in cutting the straw which drops downwardly between the two cutters 14 and 15.

The shaft 18 has fixed thereto a grooved pulley 25 about which an endless belt 26 engages. The belt 26 engages about a driving pulley 27 positioned forwardly of the cutters 14 and 15 and secured to a suitable rotating shaft forming a conventional part of the harvester or combine 11. The upper run of the belt 26 engages over a belt tensioning idler pulley 28 which is carried by a vertically disposed bracket 29 formed with an elongated slot 30 so that the shaft 31 for the pulley 28 may be vertically adjusted to properly tension the belt 26.

The shaft 32 for the cutter 15 has a relatively large pulley 33 secured to one end thereof, which engages underneath the lower run of the belt 26 so that the cutter 15 will rotate in a direction opposite from the rotation of the cutter 14 and at the same time cutter 15 will rotate at a substantially slower speed than the rotation of cutter 14.

The bottom wall 34 of the chute 10 has secured thereto an upwardly directed curved wall 35 engaging partly about the cutter 14 at the lower forward portion of the latter, and the inner wall 35 has secured thereto at least two series of spaced cutters 36 coacting with the cutting blades 21 in cutting the straw which moves downwardly between the cutter 14 and the inner wall 35. The inner wall 35, as shown in Figure 4, is provided with a plurality of spaced slots 37 in the upper or inner edge thereof, through which the cutting blades of cutter 15 are adapted to pass.

The mouth 13 through which the comminuted straw passes has positioned therein a substantially V-shaped deflector or distributor 38 so that the rearwardly moving and finely cut straw will be directed rearwardly for even distribution over the ground. The V-shaped deflector serves to separate and deflect the bulk of the straw to opposite sides of the center to prevent undue accumulation along the center.

In the use and operation of this device, the harvester or combine 11 is operated in the normal manner and the rearwardly conveyed straw which is moved by the conveyor 12 will be discharged onto and between the oppositely rotating cutters 14 and 15. The straw which is of varying lengths will be cut by the blades 21 and 24 and may also be cut by the blades 21 and 36. While there are herein disclosed four series of cutting blades on each cylindrical body 16 of the rotating cutter, it will be understood that there may be as many series of cutting blades on these cutters as may be desired. The cutter 14 which rotates at a substantially greater speed than the cutter 15 will centrifugally force the comminuted straw horizontally and outwardly through the discharge mouth 13 and the straw moved out through the mouth 13 will be divided and spread laterally by means of the V-shaped deflector 38.

I do not mean to confine myself to the exact details of construction herein disclosed, but claim all variations falling within the purview of the appended claims.

What I claim is:

[1. In a straw handling machine, a housing adapted to receive straw from the rear end of a combine, a first and second rotary cutter supported in said housing, each of said cutters including a cylindrical body having heads, a shaft extending through said heads and extending into said housing, a plurality of spaced blade members secured to each of said bodies, and each including a base at right angles to said base flange, a first pulley mounted on the shaft extending through said first cutter, a driving pulley mounted forwardly of said cutters, a belt connecting said first pulley to said driving pulley, a belt tensioning idler pulley arranged in engagement with said belt, a bracket adjustably supporting said idler pulley, a second pulley of larger diameter than said first pulley mounted on the shaft extending through said second cutter and engaging said belt whereby said second cutter will rotate slower and in an opposite direction from said first cutter, said housing including a bottom wall provided with an upwardly curved portion spaced about the first cutter, said curved portion being provided with a plurality of cutting blades, there being slots in said curved portion for the passage therethrough of the blades from said second cutter, the blades of said first and second cutters and the blades of said first cutter, and said curved portion being so spaced as to pass each other in sliding, shearing engagement, and a mouth extending from said housing on the discharge side of said first cutter for the passage therethrough of comminuted straw, said straw from said combine being received at a point between said first and second cutters.]

*2. In a straw handling machine, a housing adapted to receive straw from the rear end of a combine, a first and second rotary cutter supported in said housing, each of said cutters including a cylindrical body having heads, a shaft extending through said heads and extending into said housing, a plurality of spaced blades secured to each of said bodies, and each comprising a sharpened triangular cutting blade at right angles to said body, said housing including a bottom wall provided with an upwardly curved portion spaced about the first cutter, said curved portion being provided with a plurality of cutting blades, there being slots in said curved portion for the passage therethrough of the blades on said second cutter, the blades of said first and second cutters, and the blades of said first cutter and said curved portion, being so spaced as to pass each other in sliding, shearing engagement, drive means connected to said first cutter operable to rotate it rapidly in a direction to cause the blades thereon to move down along the upwardly curved portion of said bottom wall, means connected to said second cutter operable to give it rotation slower than and in the opposite direction from the rotation of the first cutter, and a mouth extending from said housing on the discharge side of said first cutter for the passage therethrough of comminuted straw, said straw from said combine being received at a point between said first and second cutters.*

*3. In a straw handling machine, a housing adapted to receive straw from the rear end of a combine, a first and second rotary cutter supported in said housing, each of said cutters including a cylindrical body having heads, a shaft extending through said heads and extending into said housing, a plurality of spaced sharpened cutting blades secured to each of said bodies, said housing including a bottom wall provided with an upwardly curved portion spaced about the first cutter, said curved portion being provided with a plurality of cutting blades, there being slots in said curved portion for the passage therethrough of the blades on said second cutter, the blades of said first and second cutters, and the blades of said first cutter and said curved portion being so spaced as to pass each other in sliding, shearing engagement, drive means connected to said first cutter operable to rotate it rapidly in a direction to cause the blades thereon to move down along the upwardly curved portion of said bottom wall, means connected to said second cutter operable to give it rotation slower than and in the opposite direction from the rotation of the first cutter, and a mouth extending from said housing on the discharge side of said first cutter for the passage therethrough of comminuted straw, said straw and said combine being received at a point between said first and second cutters.*

References Cited in the file of this patent or the original patent

UNITED STATES PATENTS

| | | |
|---|---|---|
| 32,992 | Gorham | Aug. 6, 1861 |
| 1,024,413 | Miks | Apr. 23, 1912 |
| 1,378,737 | Trautman | May 17, 1921 |
| 1,507,730 | Fuller | Sept. 9, 1924 |
| 1,524,887 | Ronning et al. | Feb. 3, 1925 |
| 1,702,173 | Rush | Feb. 12, 1929 |
| 1,862,396 | Gray et al. | June 7, 1932 |
| 1,914,839 | Thoen | June 20, 1933 |
| 1,968,417 | Morine | July 31, 1934 |
| 2,143,123 | Erickson | Jan. 10, 1939 |
| 2,239,486 | Edwards | Apr. 22, 1941 |
| 2,280,677 | Wagner et al. | Apr. 21, 1942 |
| 2,281,846 | Klein | May 5, 1942 |
| 2,476,465 | Tarrant | July 19, 1949 |
| 2,554,669 | Elofson | May 29, 1951 |
| 2,626,159 | Thompson | Jan. 20, 1953 |

FOREIGN PATENTS

| | | |
|---|---|---|
| 45,173 | France | Apr. 1, 1935 |